United States Patent Office 2,996,363
Patented Aug. 15, 1961

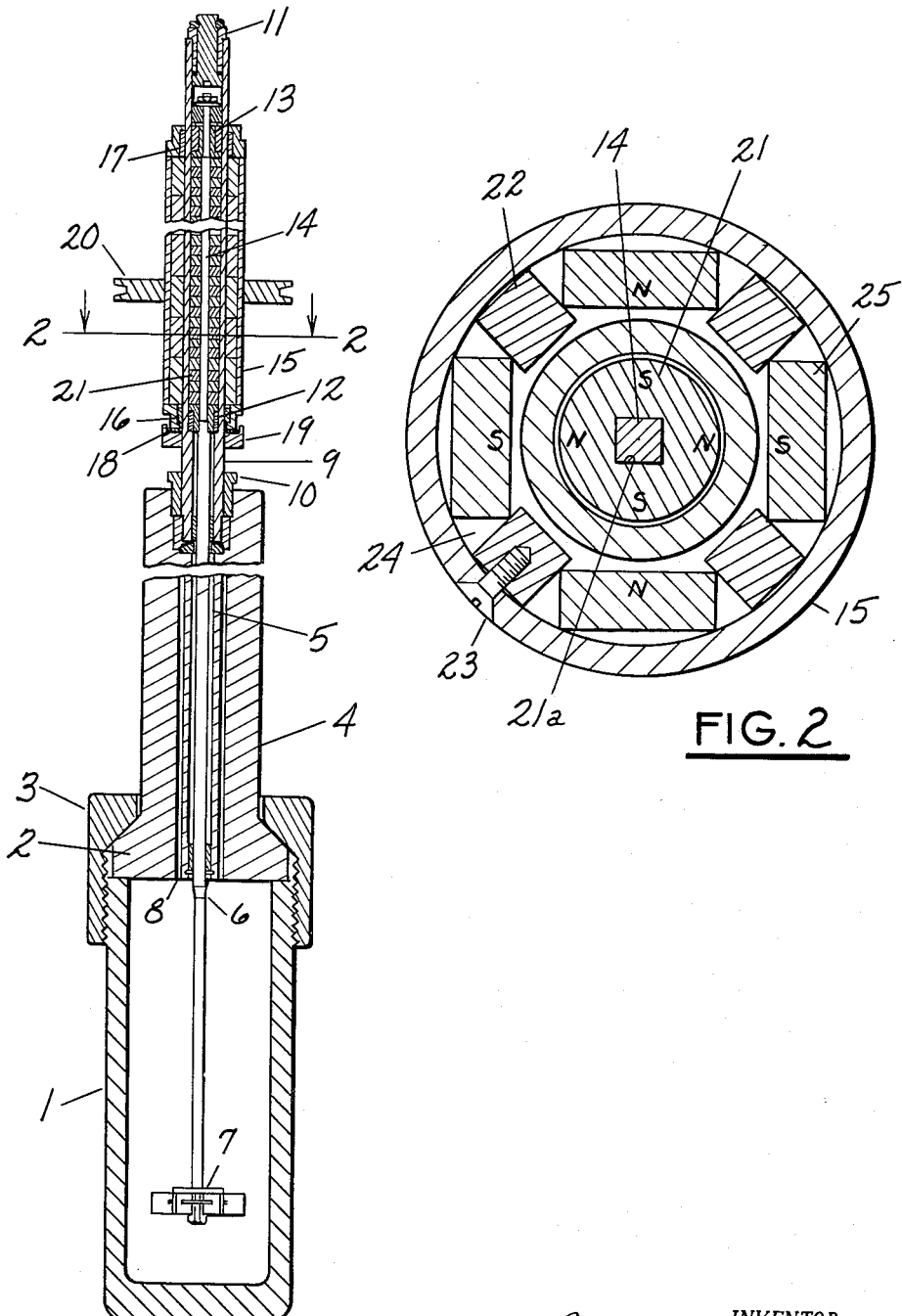

2,996,363
AUTOCLAVE
Robert F. Ruyak, Erie, Pa., assignor to Autoclave Engineers, Inc., Erie, Pa., a corporation of Pennsylvania
Filed Nov. 30, 1959, Ser. No. 856,165
2 Claims. (Cl. 23—290)

This invention is a high pressure autoclave for laboratory and pilot plant research in which agitation of the reacting substances is obtained without the use of stuffing boxes and packing and the attendant difficulties.

In the drawing, FIG. 1 is a sectional elevation through an autoclave and FIG. 2 is a section on line 2—2 of FIG. 1.

In the drawing, 1 indicates an open top pressure vessel closed by a cover 2 held in place by a nut 3. At the center of the cover is an upstanding projection 4 having a bore 5 in which is journaled an agitator shaft 6 driving an agitator 7 fixed to its lower end. Surrounding the agitator shaft is a plurality of holes 8 for various purposes such as the supply or withdrawal of reacting substances, the connection of pressure and like gages to determine the reaction conditions, and the connection of safety devices such as over pressure relief.

The upper end of the bore 5 is closed by a non-magnetic tube 9 which is sealed to the upper end of the projection 4 by a seal structure 10. The upper end of the non-magnetic tube 9 is closed by a cap 11. The non-magnetic tube 9 accordingly constitutes a sealed closure enclosing the upper end of the agitator shaft.

The agitator shaft is journaled in bearings 12, 13 arranged at the upper and lower ends of a non-circular extension 14 of the shaft. The bearings run on the inner surface of the non-magnetic tube and hold the extension 14 concentric with the tube. Opposite the non-circular extension 14 of the agitator shaft is a tube 15 of magnetic material surrounding the non-magnetic tube 9 and journaled thereon by bearings 16, 17. At the lower end of the tube 15 is a thrust bearing 18 on a collar 19 fixed to the non-magnetic tube 9. A drive pulley 20 is fixed to the magnetic tube 15.

The drive between the pulley 20 and the agitator shaft 6 is through permanent magnets. On the non-circular extension 14 of the agitator shaft are stacked a plurality of cylindical permanent magnets 21 of material such as barium ferrite ceramic which will stand the temperatures and the corrosive atmosphere which may exist within the autoclave. The magnets 21 have non-circular bores 21a slidably receiving the shaft extension 14 and the magnets are magnetized radially to present axially aligned equiangular spaced alternate north and south poles as indicated in FIG. 2. These magnets have a free running clearance with the inner surface of the non-magnetic tube 9. On the inner surface of the magnetic tube 15 are secured a plurality of axially extending radial ribs 22 preferably of non-magnetic material. There is the same angular spacing between the ribs as between the poles of the magnets 21. For the construction illustrated where there are four poles in each magnet 21 spaced 90 degrees from each other, there are four ribs 22 likewise spaced 90 degrees from each other. The ribs are suitably fastened to the tube 15 by screws 23. As is apparent from FIG. 2, adjacent pairs of ribs provide slots 24 into which can be slid a plurality of rectangular bar magnets 25 in end to end relation. The magnets 25 are polarized in the thickness direction and are arranged so that the polarity is opposite the poles of the magnets 21. That is, a south pole on the magnet 21 is opposite a north pole on a magnet 25. The ribs 22 hold the magnets 25 in place, preventing both circumferential movement of the magnets about the inner surface of the magnetic tube 15 and also preventing radially inward movement of the magnets under the forces of magnetic attraction. It will be noted that the sides of adjacent ribs converge so that the slots 24 are in the nature of dovetail slots.

What is claimed as new is:

1. In high pressure apparatus for fluid reactants, an open top pressure vessel, a cover closing the top of the vessel having an opening extending through the cover into the vessel, a non-magnetic tube concentric with said opening and upstanding from the cover, a seal between the cover and the lower end of the tube around said opening, a seal closing the upper end of the tube whereby the interior of the tube is subject to the vessel pressure, an agitator shaft extending through the opening in the cover and having its upper end within the tube and its lower end within the vessel, a stack of a plurality of cylindrical permanent magnets telescoped over and nonrotatably fixed to the upper end of said shaft, each of said magnets being magnetized to present spaced radially disposed alternate north and south poles and with like poles in the stack in axial alignment, a plurality of bearings spaced along the tube between the upper end of said shaft and the inner surface of said tube for holding the upper end of the shaft and the magnets concentric with the tube, a magnetic tube surrounding the non-magnetic tube, a plurality of bearings between and spaced along the length of the tubes for journaling the magnetic tube on the non-magnetic tube, internal axially extending ribs on the magnetic tube on the same angular spacing as said north and south poles and projecting radially inward from the inner surface of the magnetic tube, each pair of adjacent ribs defining an axial slot, magnets of like polarity received in each slot with poles opposite the poles of the magnets on the agitator shaft, and means for rotating the magnetic tube to produce a corresponding rotation of the agitator shaft.

2. In high pressure apparatus for fluid reactants, an open top pressure vessel, a cover closing the top of the vessel having an opening extending through the cover into the vessel, a non-magnetic tube concentric with said opening and upstanding from the cover, a seal between the cover and the lower end of the tube around said opening, a seal closing the upper end of the tube whereby the interior of the tube is subject to the vessel pressure, an agitator shaft extending through the opening in the cover and having its upper end within the tube and its lower end within the vessel, a stack of a plurality of cylindrical permanent magnets telescoped over and nonrotatably fixed to the upper end of said shaft, each of said magnets being magnetized to present spaced radially disposed alternate north and south poles and with like poles in the stack in axial alignment, a plurality of bearings spaced along the tube between the upper end of said shaft and the inner surface of said tube for holding the upper end of the shaft and the magnets concentric with the tube, a magnetic tube surrounding the non-magnetic tube, a plurality of bearings between and spaced along the length of the tubes for journaling the magnetic tube on the non-magnetic tube, a plurality of magnets within and nonrotatably fixed to the magnetic tube and spaced axially along the magnetic tube with poles spaced circumferentially around the non-magnetic tube and opposite the poles of the magnets on the agitator shaft, and means for rotating the magnetic tube to produce a corresponding rotation of the agitator shaft.

References Cited in the file of this patent

UNITED STATES PATENTS

| 2,165,253 | Graves | July 11, 1939 |
| 2,711,306 | Levi | June 21, 1955 |